UNITED STATES PATENT OFFICE.

ADOLPH SOMMER, OF CAMBRIDGE, MASSACHUSETTS.

SOLUTION OF SWEET CARBAMID IN OILS, &c., AND MODE OF MAKING SAME.

SPECIFICATION forming part of Letters Patent No. 524,514, dated August 14, 1894.

Application filed March 2, 1893. Serial No. 464,424. (No specimens.)

*To all whom it may concern:*

Be it known that I, ADOLPH SOMMER, of Cambridge, county of Middlesex, State of Massachusetts, have invented a new and useful Solution of Paraphenetol Carbamid in Oils, Fats, and Waxes and a Process of Making the Same; and I do hereby declare that the following is a full, clear, and exact description of the same.

In a concurrent application of even date, entitled "Solution of paraphenetol carbamid in oils, fats, waxes, resins," and bearing the Serial No. 464,423, I have shown how oils, fats or waxes may be sweetened by means of paraphenetol carbamid. Owing to the slight solubility of this substance at the ordinary temperature in such of these compounds as are neutral it frequently happens that upon standing the largest portion of the carbamid separates and the oil, fat or wax is left almost tasteless. Now I have found that this separation can to a great extent be avoided and the solubility of the carbamid in oils, fats and waxes be increased by the addition of acids which themselves are soluble in oils, fats or waxes. Many of the acids which are available for this purpose (as for instance oleic acid) occur either free or in combination in the natural oils, fats, waxes and resins, but others which do not occur therein may also be used, as for instance lactic acid. These acids I have found to dissolve the paraphenetol carbamid much more readily than their glycerids or ethers, and to be able to hold the same in solution when added to or present in the neutral oils, fats and waxes. However, unless it is desirable to impart a sour taste to the product (which I generally do by means of lactic acid), I prefer to acidify the oil, fat or wax, if it does not naturally contain a sufficient amount of free acid, by saponifying a small portion of it by means of an alkali such as caustic soda, then decomposing the soap by agitating the mixture with a dilute acid, as for instance dilute sulfuric acid, and finally washing the oil, fat or wax with water and filtering it, if necessary, through salt.

In order to prepare the solution the paraphenetol carbamid is either first combined with or dissolved in the acid, and this combination or solution added to the oil, wax, fat, or the acid is first added to or produced in the oil, wax or fat, and the paraphenetol carbamid dissolved in the mixture. In either case the solution is hastened by digesting the mixture in a water bath. If however the oil, fat or wax contains already a sufficient amount of free acid, a further addition need not be made, unless a sour taste is to be imparted. The proportion of paraphenetol carbamid which I thus dissolve varies with the degree of sweetness the product is to have but is generally between one fourth and three fourths of one per cent. of the weight of the oil, fat or wax to be sweetened.

Having thus described my invention, what I claim, and desire to secure by Letters Patent, is—

1. The method of forming a solution of paraphenetol carbamid in oils fats and waxes, which consists in dissolving the said carbamid in the oil fat or wax by means of an acid soluble in such oil fat or wax, substantially as described.

2. The method of dissolving paraphenetol carbamid in oils fats and waxes, which consists in first combining the paraphenetol carbamid with an acid soluble in the oil fat or wax and then adding this combination to the oil fat or wax, substantially as described.

3. The method of dissolving paraphenetol carbamid in oils fats and waxes, which consists in first acidifying the oil fat or wax, and then digesting the paraphenetol carbamid with the acidified oil fat or wax, substantially as described.

4. The solution in oils, fats or waxes, of paraphenetol carbamid and an acid soluble in the oil fat or wax, substantially as described.

ADOLPH SOMMER.

Witnesses:
L. F. CLAR,
MANSEL DE FREITAG.